US006188430B1

(12) United States Patent
Motai

(10) Patent No.: US 6,188,430 B1
(45) Date of Patent: Feb. 13, 2001

(54) DIGITAL CAMERA AND INK-JET PRINTING APPARATUS

(75) Inventor: Eiichi Motai, Yokohama (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/060,098

(22) Filed: Apr. 14, 1998

(30) Foreign Application Priority Data

Apr. 18, 1997 (JP) .................................................... 9-115082

(51) Int. Cl.[7] .............................. H04N 5/225; B41J 2/01; B41J 3/00; G03G 15/00

(52) U.S. Cl. .............................. 348/207; 358/906; 347/2; 347/107; 399/84

(58) Field of Search ............................... 348/207; 399/82, 399/83, 84, 144; 355/18; 347/2, 16, 107; 235/375, 454, 458; 358/906

(56) References Cited

U.S. PATENT DOCUMENTS 2,482,242 * 9/1949 Brustman ............................ 235/454
4,248,528 * 2/1981 Sahay .................................... 399/84
4,757,348 * 7/1988 Rourke et al. ......................... 399/84
5,640,647 * 6/1997 Hube ..................................... 399/84
5,757,388 * 5/1998 Stephenson ............................. 347/2
5,781,708 * 7/1998 Austin et al. ........................ 347/107
5,903,285 * 5/1999 Ju et al. ................................. 347/5

* cited by examiner

*Primary Examiner*—Wendy Garber
*Assistant Examiner*—Andrew B. Christensen
(74) *Attorney, Agent, or Firm*—Morgan & Finnegan, L.L.P.

(57) ABSTRACT

There is disclosed a digital camera in which a lens cover formed with a plurality of holes is attached to a lens barrel. Different items of the print conditions are assigned to the individual holes. The camera senses these holes formed on the cover, recognizes the print conditions based on the sensed image, and transmits the recognized condition to a printing apparatus as print condition data.

11 Claims, 6 Drawing Sheets

DIGITAL CAMERA AND INK-JET PRINTING APPARATUS

BACKGROUND OF THE INVENTION

The present invention relates to a printing system which can directly connect a digital camera and a printing apparatus, and allows the printing apparatus to directly print an image sensed by the digital camera, and also to a digital camera and printing apparatus.

Conventionally, the simplest way to print out an image sensed by a digital camera as a picture is to capture the sensed image into a PC (personal computer) via a predetermined cable if the image is recorded on an internal memory of the camera or via a PC card slot or the like arranged in the PC if the image is recorded on a PC card or the like, and to print out that image after the print conditions for an ink-jet printer (printing apparatus) are set on the PC. More specifically, the PC is interposed between the camera and printer, and the print conditions are set on that PC.

As a method of setting the print conditions upon printing an image sensed by the digital camera, conventional methods that do not use any PC are also available. For example, in one method, a dedicated adapter and TV monitor are inserted between the digital camera and ink-jet printer, and the print conditions for the ink-jet printer are set on that TV monitor. In another method, a dedicated adapter is inserted between the digital camera and ink-jet printer, and the print conditions for the ink-jet printer are set on a built-in liquid crystal monitor of the digital camera.

However, in the conventional method of capturing an image recorded in the digital camera into the PC, since intervention of the PC is required only for the purpose of setting the print conditions for the ink-jet printer, the operator of the ink-jet printer cannot directly print out the sensed image in a desired mode pertaining to the paper size, image quality, and the like.

Also, when the monitor is used only for the purpose of setting the print conditions, setups on the monitor are cumbersome. Furthermore, when the liquid crystal monitor is equipped in the digital camera, a size reduction of the digital camera cannot be attained.

When a dedicated intervening device is used, it requires high cost.

SUMMARY OF THE INVENTION

It is an object of the present invention to provide a system, which can directly connect a digital camera and printer via a predetermined interface, and can set print conditions to directly print an image in the digital camera using the printer.

In order to achieve the above object, there is provided a system for directly printing an image stored in a digital camera using a printer, comprising:

- the digital camera having a reader optically reading a member that contains a print condition in the printing apparatus;
- a recognizer recognizing the print condition from a read print condition image;
- a predetermined interface for directly connecting the digital camera and a predetermined printing apparatus; and
- the printer for setting the print condition sent via the interface, and printing a sensed image sent from the digital camera in accordance with the set print condition.

More specifically, the camera comprises image sensing means, which obtains the print condition setup image.

It is another object of the present invention to provide a digital camera which can set print conditions to directly print the sensed image using an external printer.

In order to achieve the above object, there is provided a digital camera which can store a digital image obtained by sensing an object, comprising:

- a reader optically reading a member that contains a print condition upon printing an image;
- a recognizer recognizing the print condition from a read print condition image; and
- an interface for sending data pertaining to the recognized print condition to an external printing apparatus.

More specifically, the camera recognizes data pertaining to the print conditions from a print condition image, and sends that print condition data to the printer.

The printer may also recognize the print conditions from the print condition image. It is, therefore, still another object of the present invention to provide a digital camera which can set print conditions, capture the set print conditions as an image, and send the print condition image to the printer. That is, there is provided a digital camera which can store a digital image obtained by sensing an object, comprising:

- a reader optically reading a member that contains a print condition; and
- an interface for sending a read print condition image to a printing apparatus.

It is still another object of the present invention to provide a digital camera which has a lens cover formed with a plurality of openings used for setting the print conditions.

It is still another object of the present invention to provide a digital camera which can capture the set print conditions as an image, and has a switch for selecting whether or not the print condition image is to be sent to the printing apparatus.

It is still another object of the present invention to provide a digital camera which can capture the set print conditions as an image, and comprises a protocol for setting in cooperation with the printer whether or not the print condition image is to be sent to the printer.

It is still another object of the present invention to provide a digital camera which has a lens cover formed with a plurality of openings used for setting the print conditions.

The camera of the present invention has various aspects as follows.

According to a preferred aspect of the present invention, the reader comprises:

- a lens cover which serves as the member, and is formed with a plurality of openings, each of which passes light therethrough and is free to open/close;
- a lens casing to which the lens cover is to be attached;
- a CCD converting light passing through a lens into an image signal; and
- a memory storing the image signal.

According to a preferred aspect of the present invention, the reader comprises:

- a sheet which serves as the member, and can be formed with holes that pass light therethrough;
- a lens adapter which can receive the sheet;
- a lens casing to which the lens adapter is to be attached;
- a CCD for converting light passing through a lens into an image signal; and
- a memory for storing the image signal.

According to a preferred aspect of the present invention, the camera further comprises:

a switch which is closed upon depression; and a control program for setting the camera in a print condition setup mode when the switch is closed, wherein the member has an actuator for energizing the switch when the member is attached to a front end of a lens barrel of the camera.

According to a preferred aspect of the present invention, the camera further compries a start switch operated by a user to start external transfer of data pertaining to the recognized print condition.

According to a preferred aspect of the present invention, the camera has:

a first mode for making an external controller set the print condition in a printing apparatus; and a second mode for directly setting the print condition in the printing apparatus on the basis of a print condition setup image, and the camera further comprises a mode switch, which is energized when the member is attached to the camera, and sets the camera in the second mode when the switch is closed.

According to a preferred aspect of the present invention, the member comprises:

a plurality of holes which are assigned predetermined items of the print conditions, are aligned in a first direction, and are free to open/close; and a slide member which is slidable along the plurality of holes and closes some or all of the plurality of holes.

According to a preferred aspect of the present invention, the member comprises:

a plurality of holes which are assigned predetermined items of the print conditions, are aligned in a first direction, and are free to open/close.

According to a preferred aspect of the present invention, the member comprises:

a plurality of marks which are assigned predetermined items of the print conditions, and are aligned in a first direction, and the marks can be painted by a user.

According to a preferred aspect of the present invention, the reader comprises:

a sheet which serves as the member, and on which a mark can be written;

a lens adapter which can receive the sheet;

a lens casing to which the lens adapter is to be attached;

a CCD for converting light passing through a lens into an image signal; and a memory for storing the image signal.

According to a preferred aspect of the present invention, a plurality of temporary holes which can be changed into actual holes by perforations are formed on the member.

Other features and advantages of the present invention will be apparent from the following description taken in conjunction with the accompanying drawings, in which like reference characters designate the same or similar parts throughout the figures thereof.

DETAILED DESCRIPTION OF THE INVENTION

The preferred embodiments of the present invention will be explained hereinafter with reference to the accompanying drawings.

<System Arrangement>

Figure 1:
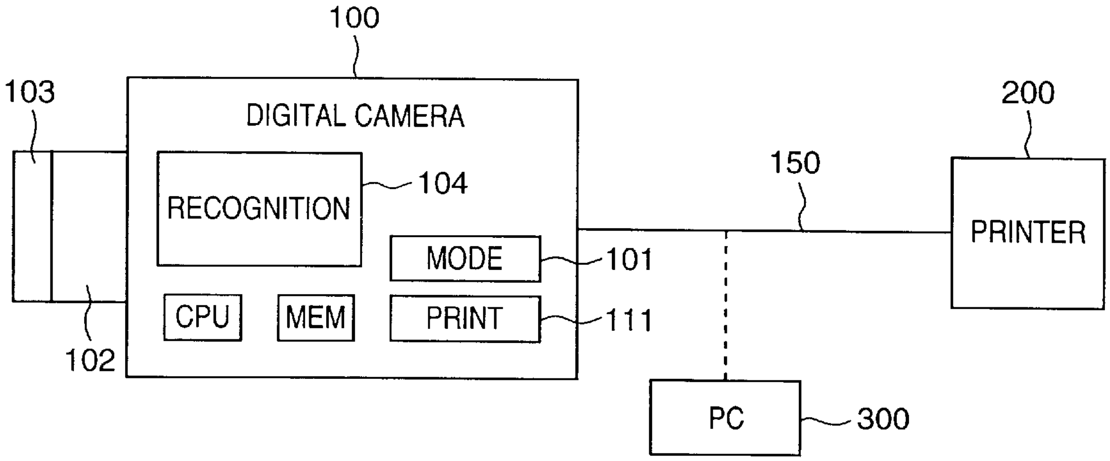
FIG. 1 is a block diagram showing the arrangement of a digital camera/printer system according to the present invention.

FIG. 1 shows the basic arrangement of a printing system according to the present invention. Referring to FIG. 1, reference numeral 100 denotes a digital camera; 200, a printer of, for example, an ink-jet scheme; and 150, an interface cable for connecting the camera 100 and printer 200.

The interface cable 150 may use, for example, a known RS232 interface cable. Also, the printer 200 has an interface function that can interpret an existing print condition setup protocol. Note that the print condition setup protocol is used for setting the print conditions of the printer 200, and a conventional protocol for setting the print conditions between a PC (not shown) and the printer may be used in this embodiment.

In this embodiment, as the print conditions, the following seven parameters can be set:

Printer type (thermal ink-jet or bubble-jet)

Print mode (vertical printing, horizontal printing)

Paper Setup (A4 portrait, B5 portrait, postcard, and the like)

Print direction (one-way or two-way)

Print quality (fine, draft)

Density (dark, light)

Color correction

Especially, as for the color correction conditions, balance conditions for cyan, magenta, yellow, and black can be set.

Referring back to FIG. 1, reference numeral 300 denotes a known PC. In this embodiment, the PC is not necessary for setting the print conditions. The camera 100 used in the system of the present invention supports two protocols, i.e., a camera setup protocol used for setting the print conditions for directly outputting an image to the printer 200, and a PC setup protocol for setting the print conditions via the PC 300. The user can select one of these protocols by setting a mode switch 101 at a direct or indirect position.

The PC setup protocol is the existing one; the camera 100 need only send an image to the PC, and the user sets the print conditions via an application program on the PC. The PC sends data pertaining to the print conditions to the printer to set them in the printer, and then sends image data to be printed.

In the camera setup protocol, the camera 100 sends data pertaining to the print conditions to the printer to set them in the printer, and then sends image data to be printed to the printer 200.

In FIG. 1, when the camera setup protocol is used, the print conditions are optically captured by the camera 100. As will be described later, such setups are optically readably made, and an optical image representing the set conditions is converted into an electronic image by a CCD (not shown) via a lens barrel 102 including an image sensing lens as in a normal image sensing mode. The camera 100 comprises a recognition unit 104 for recognizing the set print conditions from the electronic image. The recognition unit 104 converts the recognition result into a known print condition setup command, and sends the command to the printer 200 via the interface cable 150 in the camera setup protocol.

In the system shown in FIG. 1, the recognition unit 104 of the camera 100 sets the print conditions based on the condition setup image. Alternatively, the recognition unit 104 may be arranged in the printer 200. In this case, the camera 100 sends the condition setup image to the printer 200 as an image, and the recognition unit 104 of the printer recognizes the print conditions based on the received image.

<Camera Arrangement> . . . First Embodiment

Figure 2:
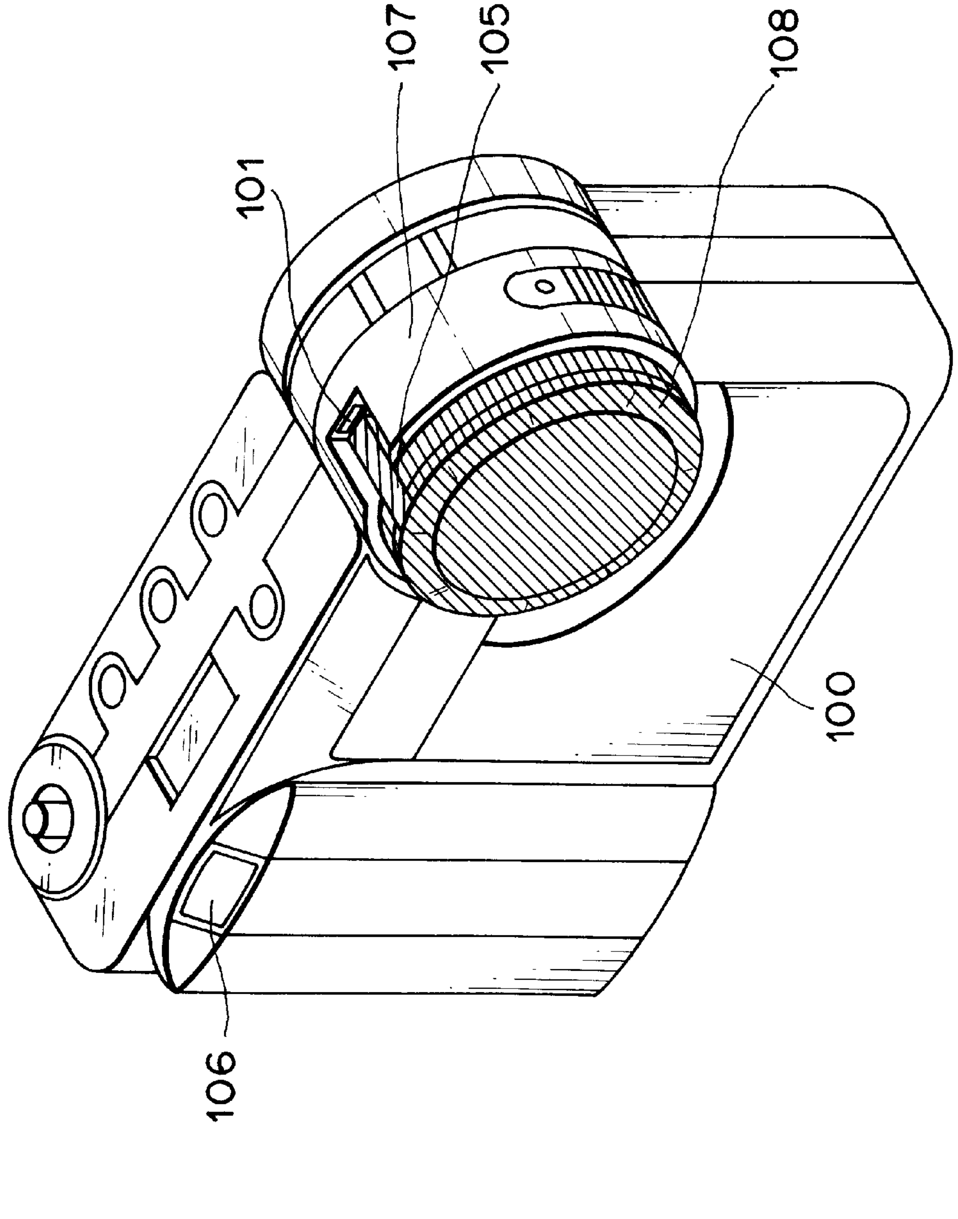
FIG. 2 is a perspective view of a digital camera according to an embodiment of the present invention.

FIG. 2 shows the arrangement of the camera 100 used in the system of this embodiment.

Referring to FIG. 2, reference numeral 100 denotes a digital camera main body; 106, a shutter button; 107, a finder & lens section of the digital camera; and 108, a black lens cover. This cover 108 has a projection 105 for driving the mode switch 101.

Figure 3A:
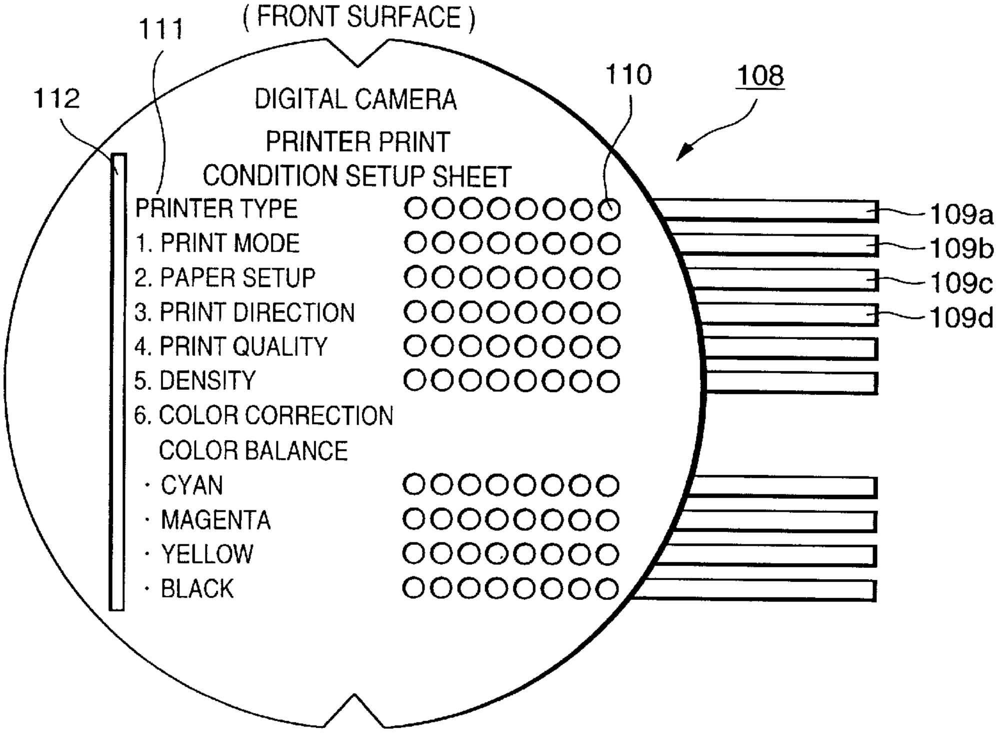
FIG. 3A is a top view of a lens cover used in the camera shown in FIG. 2.
Figure 3B:
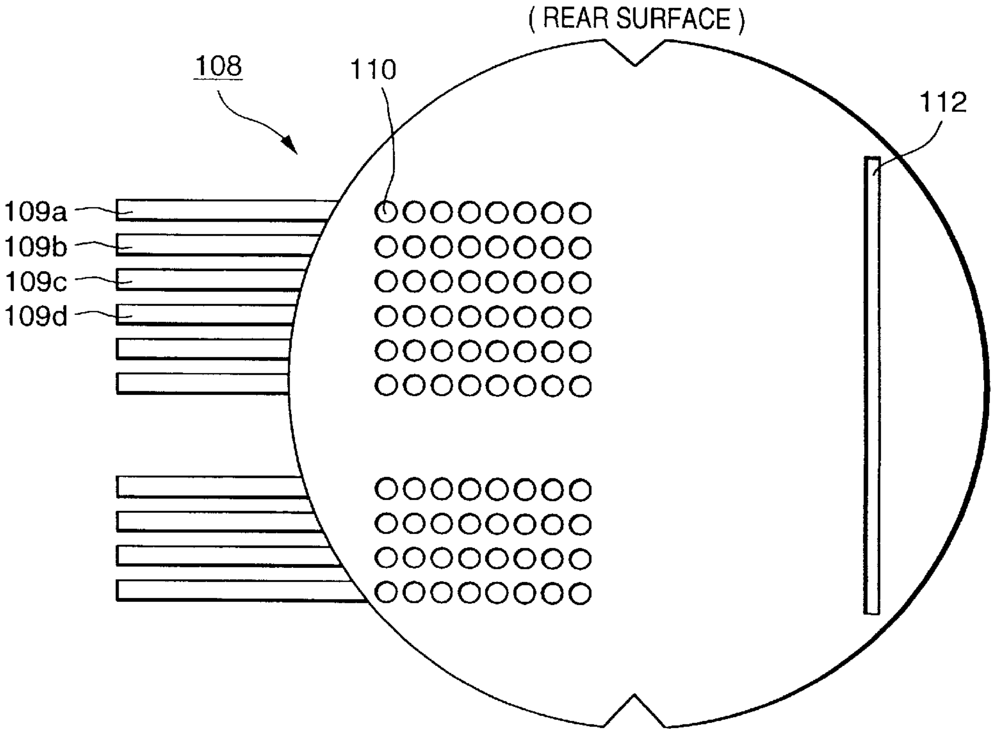
FIG. 3B is a bottom view of the lens cover used in the camera shown in FIG. 2.

The cover 108 is a dedicated detachable cover used for setting the print conditions, and is formed with a plurality of print condition setup holes used for setting the print conditions. FIG. 3A shows the top surface of the cover 108, and FIG. 3B shows its rear surface.

In FIG. 3A, reference numeral 111 denotes a condition setup items display area, on which letters that represent condition setup items are printed to be read by the user. Reference numeral 110 denotes a plurality of round holes; and 112, a slit which is elongated in the vertical direction (up-and-down direction in FIG. 3A). The round holes 110 and slit pass external visible light therethrough, which then enters the lens barrel 107.

In the example shown in FIG. 3A, a plurality of round holes 110 (eight holes per item) are formed in the horizontal direction in units of items of the print conditions, and details of the print conditions are assigned in advance to the individual round hole positions.

Also, a plurality of grooves for receiving opaque, plastic slide blocks 109 are formed in the cover 108. In the example in FIG. 3A, since there are ten print condition items, ten slide blocks are prepared.

Figure 4A:
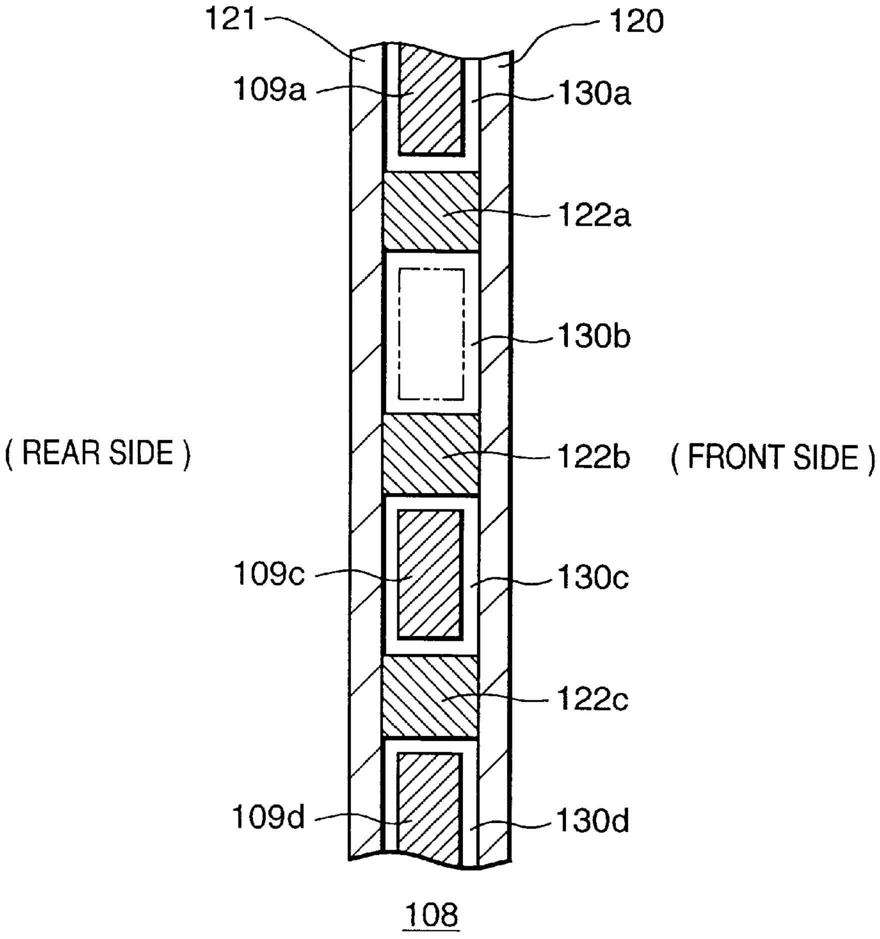
FIG. 4A is a partial sectional view of the lens cover shown in FIGS. 3A and 3B.

FIG. 4A is a sectional view of the cover 108. As described above, the cover 108 is formed of black plastic, and a plurality of hollow grooves 130*a*, 130*b*, 130*c*, 130*d*, . . . partitioned by opaque, black plastic members 122*a*, 122*b*, 122*c*, . . . are formed in the cover 108, as shown in FIG. 4A. These hollow grooves extend in a direction perpendicular to the plane of the drawing of FIG. 4A, and in the right-and-left direction in FIG. 3A. The vertical position of each hollow groove in the cover 108 corresponds to that of the hole 110. These hollow grooves 130*a*, 130*b*, 130*c*, 130*d*, . . . receive slide blocks 109*a*, 109*b*, 109*c*, 109*d*, . . . , and when the user moves these slide blocks to the right or left, the blocks slide in the respective hollow grooves.

In the example in FIG. 4A, the slide blocks 109*a*, 109*c*, and 109*d* of the slide blocks 109*a*, 109*b*, 109*c*, and 109*d* reach the other-end portions of the hollow grooves 130*a*, 130*c*, and 130*d*, and only the slide block 109*b* does not reach the end of the hollow groove 130*b*. Hence, external light passes through the print condition setup holes 110 corresponding to the hollow groove 130*b*, and reaches the CCD (not shown). On the other hand, since the print condition setup holes corresponding to the hollow grooves 130*a*, 130*c*, and 130*d* are filled with the slide blocks 109*a*, 109*c*, and 109*d*, the external light is intercepted by these blocks. Therefore, when the user presses the shutter button, light is projected onto pixels on the CCD corresponding to the holes and slit which are not closed by the slide blocks, thus obtaining a print condition setup image.

Figure 4B:
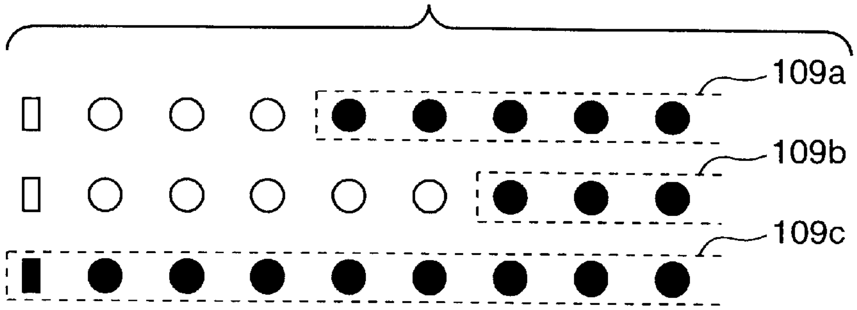
FIG. 4B shows an example of a print condition setup image obtained by the lens cover shown in FIGS. 3A and 3B.

FIG. 4B shows an example of the print condition setup image obtained when the user appropriately sets the slide blocks 109. The print condition setup image is binarized by recognition (to be described later), and each hole position gives one of two pieces of print condition setup information when it is open or closed.

When the user sets the print output conditions, he or she horizontally slides desired slide blocks 109 on the cover 108 and stops them at given positions to conceal the target holes 110 and slit portions 112. Then, the user attaches the dedicated condition setup lens cover 108 to the camera.

Figure 5:
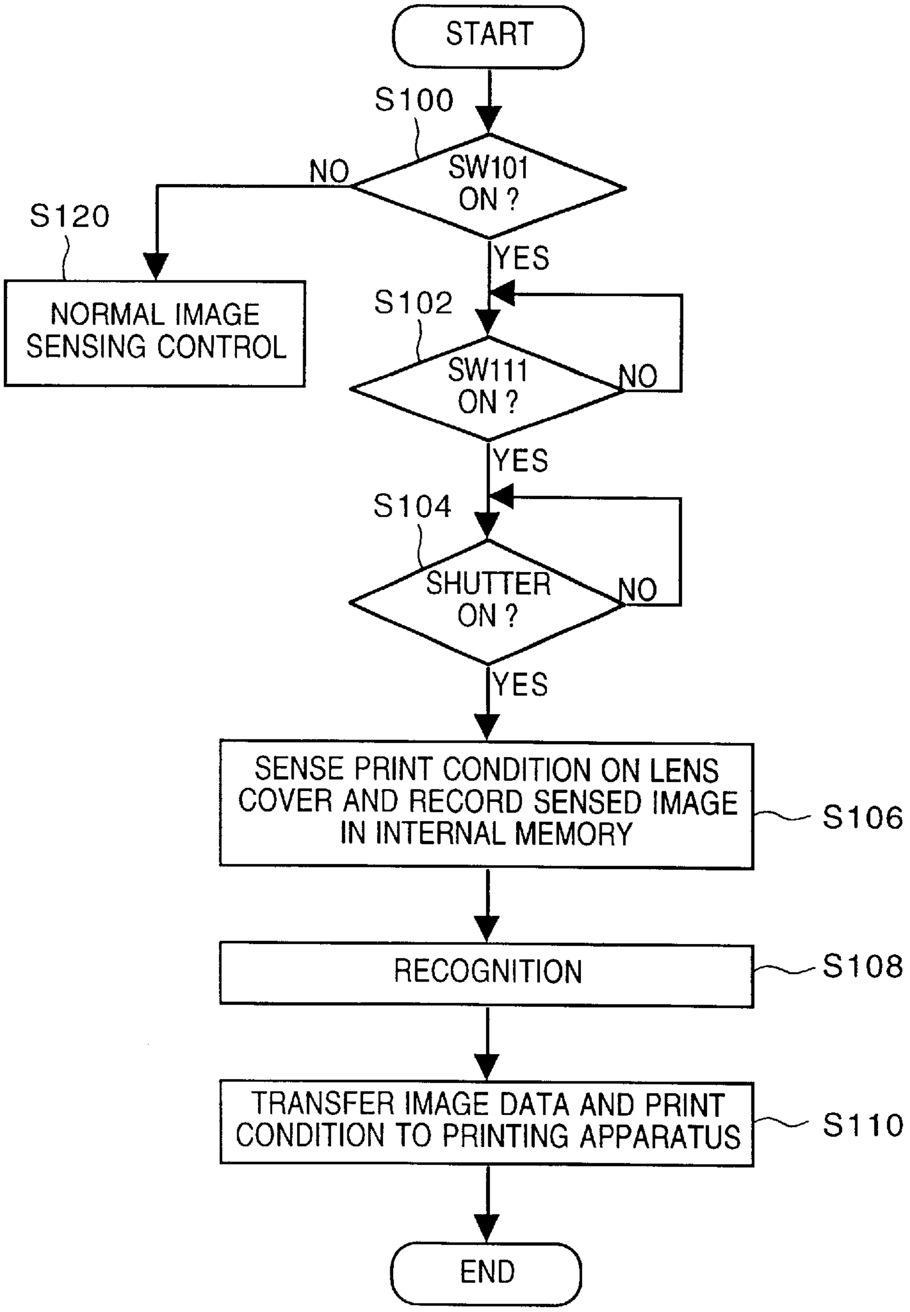
FIG. 5 is a flow chart showing the operation of the digital camera.

The control sequence of the internal control program of the digital camera 100 of this embodiment will be explained below with reference to the flow chart in FIG. 5. This control sequence is executed by an internal CPU of the camera shown in FIG. 1, and its protocol is stored in a memory (MEM).

When the user attaches the dedicated print condition setup lens cover 108 set with the print conditions to the camera, the projection (stopper) 105 of the cover 108 presses the switch 101. Upon depression of the switch 101, step S100 and the subsequent steps in FIG. 5 are executed. More specifically, the control waits in step S102 until the user presses a "direct print switch" 111. Upon depression of this switch, step S104 is executed. That is, the print condition setup process of this camera is started when the user attaches the cover 108 and presses the switch 111. In other words, since the switch 111 is arranged, attachment of the dedicated cover 108 does not directly trigger the print condition setups, and can also serve as a normal lens cover.

In step S104, the control waits until the user presses the shutter 106. When the user has pressed the shutter 106, the camera captures the print condition setup image by normal image sensing, and stores it in its internal memory (MEM), in step S106.

In this case, when binary data is captured by the digital camera 100, the camera may roughly read (pre-scan) the image on the lens cover 108 to recognize the data start position.

The captured print condition setup image is passed to the recognition unit instep S108. The print condition setup image is binarized and interpreted by the recognition unit, thus recognizing the print conditions. The recognized print conditions are converted into a known print condition setup command format.

In step S110, the already sensed object image data recorded in the memory and the print condition data obtained in step S108 are simultaneously sent to the printer. Alternatively, the print condition setup command is sent to the printer first, and then, the sensed object image data is sent thereto.

Upon reception of the print condition setup command, the printer sets the print conditions, and then prints the received image.

In this way, according to the first embodiment, since the digital camera and printer such as an ink-jet printing apparatus are directly connected, and the print conditions can be set by simple operation, a simple, low-cost printing system for printing an image sensed by the digital camera using the ink-jet printer can be realized while making the digital camera main body compact.

Note that the printer 200 may recognize the print conditions from the print condition setup image, as described above.

Upon forming the condition setup image, natural light is used in the above embodiment. Alternatively, a backlight may be arranged in correspondence with the holes 110 and slit, and may be used as a light source.

<Camera Arrangement> . . . Second Embodiment

The second embodiment of a digital camera according to the present invention will be described below with reference to the accompanying drawings.

The first embodiment is directed to the print condition setup method using only the lens cover of the digital camera. Since the lens cover has a small area, the number of types of conditions that can be set is limited. For this reason, the second embodiment uses a sheet which can set more condition items than the lens cover. The second embodiment requires an adapter for attaching the sheet. As this adapter, a normal closeup adapter may be used. However, in consideration of convenience upon exchanging the sheet, the adapter is prepared by forming a sheet attachment groove on a normal closeup adapter, so that it can be used for both the closeup and sheet attachment purposes.

Figure 6:
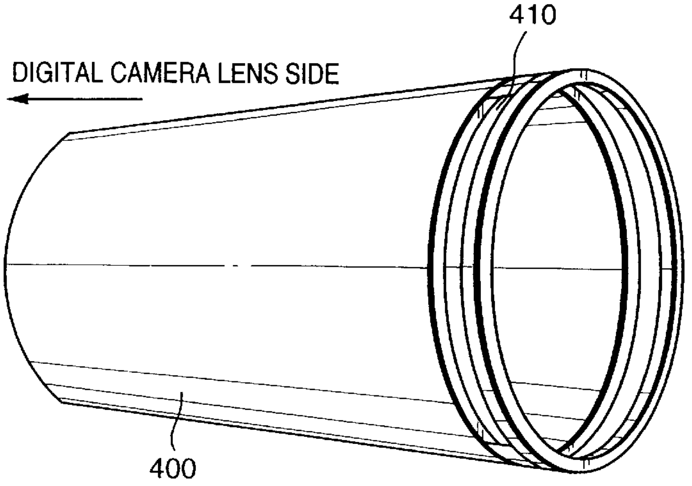
FIG. 6 is a perspective view of a closeup adapter according to the second embodiment of the present invention.

Note that the camera of the second embodiment is substantially the same as the digital camera shown in FIG. 2. FIG. 6 shows the outer appearance of a closeup/print condition setup adapter 400. In FIG. 6, reference numeral 410 denotes a groove, which receives a print condition setup sheet. With this groove, various types of sheets can be exchangeably set.

Note that the length of the adapter 400 is determined so that the image on the sheet surface inserted into the sheet groove 410 is formed on the CCD.

Figure 7:
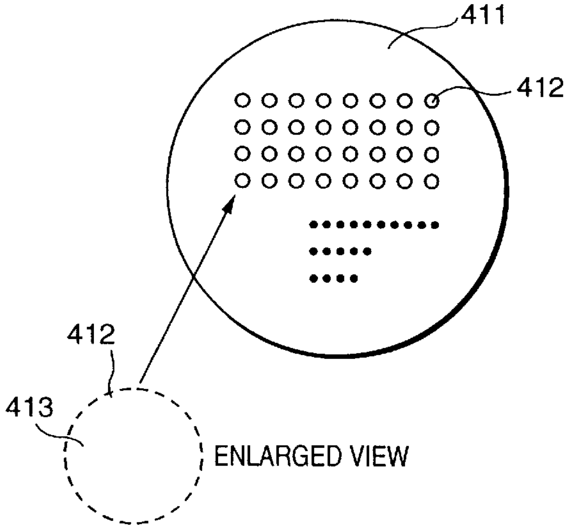
FIG. 7 is a plan view for explaining the shape of the sheet to be inserted into the adapter shown in FIG. 6.

FIG. 7 is a plan view of a condition setup sheet 411. Many temporary holes 412 are formed on the sheet 411. Since perforations 413 are formed on each temporary hole, an actual hole can be easily formed.

The control sequence of the second embodiment is substantially the same as that in the first embodiment. More specifically, the user attaches the print condition setup adapter 400 to the digital camera 100, and inserts the sheet 411 set with the print conditions into the condition setup sheet groove 410. The camera 100 senses the image on that sheet, and writes the image data in the memory.

The subsequent control processes are the same as those in the first embodiment.

Note that the printer may recognize the print conditions from the print condition setup image as in the modification of the first embodiment.

To recapitulate, according to the second embodiment, more print conditions can be set by a simple method in addition to the effect of the first embodiment, and the degree of freedom in print condition setups can be greatly improved.

<Modification>

As for the sheet of the second embodiment, temporary holes on the sheet may be formed by means other than perforations. For example, the user may form a hole with a tool having a sharp distal end.

Figure 8:
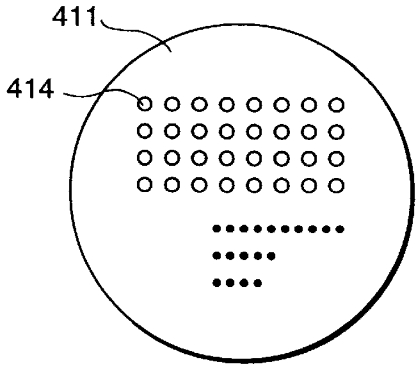
FIG. 8 is a plan view for explaining another shape of the sheet to be inserted into the adapter shown in FIG. 6.

In the second embodiment, the print conditions may be set using marks. FIG. 8 shows the shape of a sheet according to that modification, and many marks ○ are printed. That is, this sheet is a mark-sheet type print condition setup sheet. The user fills the mark corresponding to the item to be set (○→●).

The print conditions sensed as binary data is recorded on a memory, and both the sensed image data to be printed, and print conditions are transferred to an ink-jet recording apparatus (not shown) via a cable, or infrared ray communication means or the like. The ink-jet printing apparatus prints out a photograph image under the designated print conditions.

<Another Embodiment>

In the above description, as a printing system for printing an image sensed by the digital camera, a system as a combination of the digital camera and ink-jet printing apparatus (including all the types of ink-jet printing apparatuses called on-demand ink-jet type, thermal ink-jet type, non-impact bubble-jet type, and the like) has been described. Also, the present invention can be applied to other low-cost printing apparatuses such as a sublimation thermal transfer type that can attain gradation expression by temperature, molten thermal transfer type using dry inks, and the like as inexpensive printing apparatuses which can be easily operated by the user. Furthermore, the present invention can be applied to a color laser printer, which is expected to become less expensive in the future, although it is not popular since it is rather expensive currently.

As for the digital camera used in this system, not only a dedicated digital camera but also a hybrid digital camera such as a still image digital camera built in a video camera using a DVC (digital video cassette) may be used.

The interface is not limited to the one using a cable. For example, an interface using infrared rays, radio waves, or the like may be used.

In the above embodiments, print condition items are assigned to the individual holes or marks. However, the present invention is not limited to this. For example, binary values may be given to the individual holes or marks, and each print condition item may be assigned by a decimal value of the binary values of a plurality of open holes.

As many apparently widely different embodiments of the present invention can be made without departing from the spirit and scope thereof, it is to be understood that the invention is not limited to the specific embodiments thereof except as defined in the appended claims.

What is claimed is:

1. A digital camera which can store a digital image obtained by sensing an object, comprising:

a reader for optically reading a member that contains at least one print condition upon printing an image;

a recognizer recognizing the print conditions form a read print condition image;

an interface for sending data pertaining to the recognized print condition to an external printing apparatus;

a switch which is closed upon depression; and a control program for setting said camera in a print condition setup mode when said switch is closed, wherein said member has an actuator for energizing said switch when said member is attached to a front end of a lens barrel of said camera.

2. The camera according to claim 1, wherein said reader comprises:

a lens cover which serves as said member, and is formed with a plurality of openings, each of which passes light therethrough and is free to open/close;

a lens casing to which said lens cover is to be attached;

a CCD for converting light passing through a lens into an image signal; and a memory for storing the image signal.

3. The camera according to claim 1, wherein said reader comprises:

a sheet which serves as said member, and can be formed with holes that pass light therethrough;

a lens adapter which can receive said sheet;

a lens casing to which said lens adapter is to be attached;

a CCD for converting light passing through a lens into an image signal; and a memory storing the image signal.

4. The camera according to claim 1, further comprising:

a start switch operated by a user to start external transfer of data pertaining to the recognized print condition.

5. The camera according to claim 1, wherein said camera a first mode for making an external controller set the print condition in a printer; and a second mode for directly setting the print condition in the printer on the basis of a print condition setup image, and said camera further comprises a mode switch, which is energized when a member is attached to a camera, and sets said camera in the second mode when said switch is closed.

6. The camera according to claim 1, wherein said member comprises:

a plurality of holes which are assigned predetermined items of the print conditions, are aligned in a first direction, and are free to open/close; and a slide member which is slidable along said plurality of holes and closes some or all of said plurality of holes.

7. The camera according to claim 1, wherein said member comprises:

a plurality of holes which are assigned predetermined items of the print conditions, are aligned in a first direction, and are free to open/close.

8. The camera according to claim 1, wherein said member comprises:

a plurality of marks which are assigned predetermined items of the print conditions, and are aligned in a first direction, and said marks can be painted by a user.

9. The camera according to claim 1, wherein said reader comprises:

a sheet which serves as said member, and on which a mark can be written;

a lens adapter which can receive said sheet;

a lens casing to which said lens adapter is to be attached;

a CCD converting light passing through a lens into an image signal; and a memory storing the image signal.

10. The camera according to claim 1, wherein a plurality of temporary holes which can be changed into actual holes by perforations are formed on said member.

11. The camera according to claim 1, wherein the printing apparatus comprises an ink-jet printing apparatus for printing an image by ejecting ink in a detachable ink cartridge via a nozzle.

* * * * *

UNITED STATES PATENT AND TRADEMARK OFFICE

CERTIFICATE OF CORRECTION

PATENT NO. : 6,188,430 B1
DATED : February 13, 2001
INVENTOR(S) : Eiichi Motai

It is certified that error appears in the above-identified patent and that said Letters Patent is hereby corrected as shown below:

Column 3,
Line 8, delete "compries" and insert therefor -- comprises --

Column 9, claim 5,
Line 12, after "camera" insert -- has: --

Signed and Sealed this

Second Day of April, 2002

*Attest:*

JAMES E. ROGAN

*Attesting Officer* *Director of the United States Patent and Trademark Office*